United States Patent Office 2,786,481
Patented Mar. 26, 1957

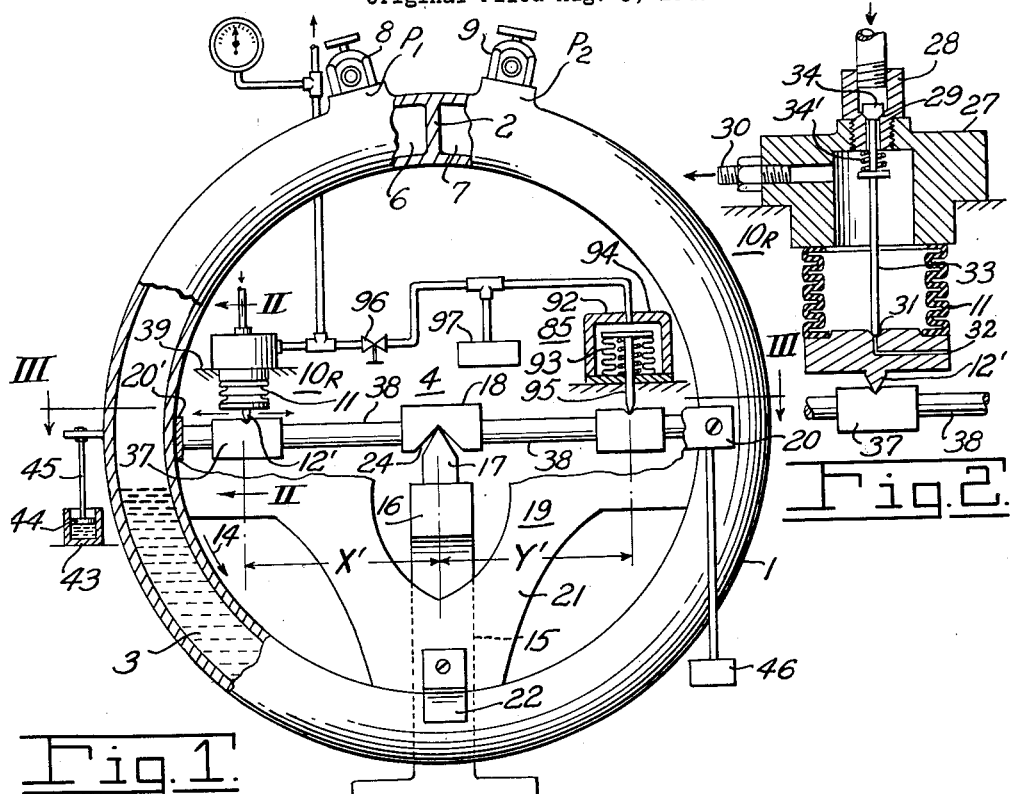
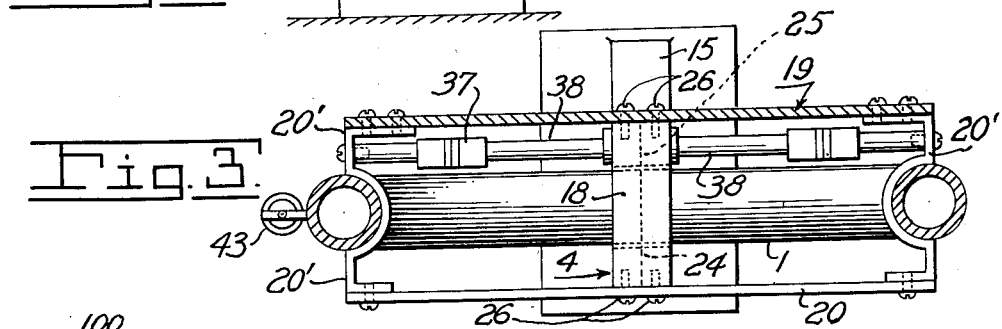
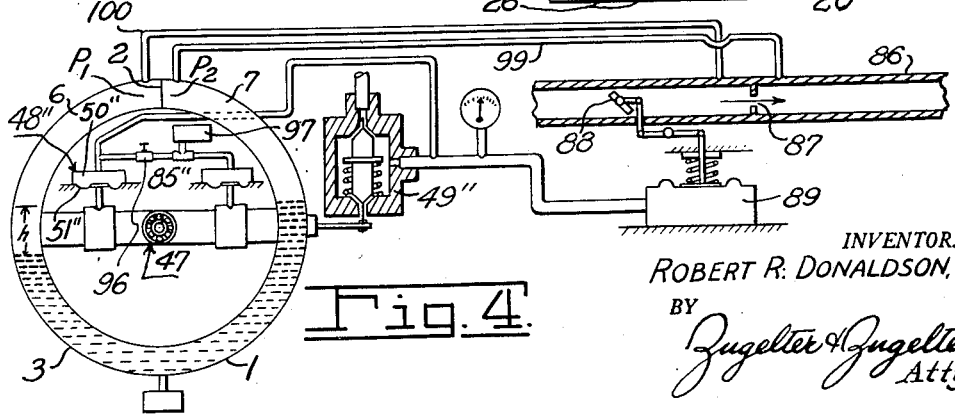

2,786,481

PRESSURE DIFFERENTIAL RESPONSIVE DEVICES

Robert R. Donaldson, Jr., Forest Hills, Pa., assignor to Hagan Corporation, Pittsburgh, Pa., a corporation of Pennsylvania Original application August 9, 1949, Serial No. 109,324, now Patent No. 2,661,754, dated December 8, 1953. Divided and this application October 1, 1953, Serial No. 383,543

3 Claims. (Cl. 137—86)

This application is a division of my co-pending application, Serial No. 109,324, filed August 9, 1949, (now Patent No. 2,661,754 granted December 8, 1953) and assigned to Hagan Corporation of Pittsburgh, Pennsylvania.

This invention relates to pressure differential responsive devices, and more particularly to devices of the type embodying a hollow ring containing a heavy liquid, and a partition which, with the liquid, forms two pressure chambers in which the differential pressure acts to develop a turning torque or force on the ring, and pressure-developing and balancing means operatively connected to the ring. The pressure developed is utilized to hold the ring in a substantially fixed or null position, by balancing the differential turning force applied to the ring throughout the range of pressure differential to which the device responds. Since the motion of the ring is nil, and only the heavy liquid within the ring moves, there being substantially no friction between the liquid and the ring, the device is substantially frictionless.

An object of this invention is to provide a ring-type pressure differential responsive device having a fluid pressure-sending device and a balancer responsive to the value of the pressure developed by the sending device, for restraining the ring to a substantially fixed or null position throughout the operating range of the ring.

A further object of the invention is to provide a device of the character referred to above, in which there is only sufficient angular motion of the ring to actuate a fluid pressure-sending valve or other device, turning of the ring being opposed by a balancer whose balancing and opposing force is a function of the fluid pressure developed, and proportional to the value of the pressure differential acting on the ring, the balancer causing the ring to remain substantially fixed in position.

And a still further object of the invention is to provide a device of the character referred to above, having a force-developing device, such as a valve, actuated by the ring, and an automatic balancer and automatic re-set, responsive to the control pressure or force developed by said valve, whereby the device may be utilized as a regulator, the ring of the device having only slight angular movement at any time, and a null position at balance.

These and other objects of the invention will in part be apparent, and will in part be obvious, from the following specification and drawings, in which:

Figure 1 is a more or less diagrammatic view of a regulator embodying a pressure differential responsive ring and an automatic re-set, arranged and constructed in accordance with the invention;

Fig. 2 is a view in section, taken on line II—II of a balancer and valve assembly embodied in the regulator of Fig. 1;

Fig. 3 is a view in section, taken on line III of Fig. 1; and

Fig. 4 is a modified form of the regulator shown in Fig. 1, as applied to the regulation of the flow of fluid in a duct, conduit, or pipe line, to maintain a substantially constant differential across an orifice therein.

In each of the several forms of the invention, a hollow ring or toroid 1 is provided, having therein a partition 2 and a quantity of heavy liquid 3, such as mercury. The ring is mounted at its center on a frictionless bearing 4. When so mounted, and if the ring is free of restraint or externally-applied forces, it assumes a position such as indicated in Fig. 1. In this position the partition 2 is above the bearing 4, and in a vertical plane passing through the bearing of the ring, and the liquid 3 assumes a horizontal level. The quantity of liquid employed is such as to form, with the partition 2, pressure-receiving chambers 6 and 7 that are sealed from each other by the liquid. To these chambers unequal pressures, such as the pressure differential across an orifice, may be applied, the pressure being admitted to the chambers through inlet fittings 8 and 9, respectively. The higher pressure of the pressure differential is admitted through fitting 8, and may be designated as $P_1$, and the lower pressure of the differential is admitted through fitting 9, and may be designated as $P_2$.

The device shown in Fig. 1 includes a fluid or pneumatic balancer and valve assembly 10R and an automatic re-set 85. The balancer 10R has a flexible member or wall 11 that acts through a point bearing 12' on a block 37, that is slidably mounted on a bar 38, which extends across the ring at its diameter. Re-set 85 acts on bar 38 with device 10R, but on the opposite of the bearing 4. The bar 38 is secured at its ends to the ring and to the bearing 4.

Bearing 4 may be of the knife edge type, as shown in Fig. 1, or it may be of the ball bearing or other anti-friction type, as shown in Fig. 4. The bearing illustrated in Fig. 1 is carried by a support pedestal 15, disposed behind the ring and having a forwardly-projecting arm 16, on which a knife edge 17 of the bearing is mounted. A complementary part 18 of the bearing is carried by and between a pair of spaced members 19 and 20, extending across the diameter of the ring. Member 19 is secured at its ends to brackets 20', attached to the ring at diametrically-opposite sides thereof. The diameter bar 38 is secured to the brackets 20' and the bearing part 18, as shown.

Bearing part 18 comprises a rigid member having inverted V-shaped notches or ways 24 and 25 at the opposite ends thereof, which seat on the edge of the knife edge 17. The line of contact between the bearing members 17 and 18 is at the center of ring 1. Member 18, as shown, is secured at its opposite ends to members 19 and 20 by screws 26, or other suitable means.

The valve and balancer assembly 10R comprises a body 27, having an inlet port fitting 28 provided with a valve seat 29, an outlet or sending port 30, and an exhaust port 31 formed in the flexible member 11. Flexible member 11 is shown as a bellows, which is secured to the bottom of body 27 to close the same. In other words, the interiors of the body and the bellows are in communication and, together, form a pressure chamber. The exhaust port 31 is formed in the bottom of the bellows 11, through which the interior of the housing and bellows may be exhausted to atmosphere via a lateral passageway 32. A valve stem 33, within the housing, has a valve element 34 at its upper end disposed to seat on the inlet port seat 29. The lower end of stem 33 controls the exhaust port seat 31. A light compression spring 34' may be employed to urge the valve stem in a direction to close the inlet port. When the device is in use, a source of fluid pressure, such as compressed air at constant pressure, is applied to the inlet fitting 28. When the external force applied to the bellows is in balance with the force of the internal pressure on the bellows, the inlet and exhaust ports are closed. If the external force increases from a condition of balance, the valve stem is moved to open the inlet port and thereby increase the pressure until external force is balanced. Conversely, if the external force decreased, the inlet port remains closed, but the exhaust port opens, thereby decreasing the pressure until the force thereof balances the external force.

The bottom of bellows 11 acts through bearing point 12' on the block 37 on the diameter bar 38. Block 37 is adjustable towards or away from bearing 4, to shorten or lengthen the radius arm 38', at which the force or bellows 11 is applied to ring 1.

In order that the line of action of bearing point 12' may always be vertical for every position of block 37, the valve and balancer assembly 10R is also adjustably attached to its support or mounting 39. The balancer 10R is adjustable laterally to coincide with adjustments of the block 37.

Valves of the type embodied in the assembly 10R have a tendency to vibrate because of a chattering that develops between the valve stem and the inlet and exhaust seats. This vibration may occur only when certain values of pressure occur within the body and bellows; however, it is objectionable and should be prevented. These vibrations may be damped out by means of a dash pot in the form of a cup 43, having therein a liquid, such as oil, and a loosely fitting piston 44 connected to ring 1 by a link 45.

Ring 1 may be provided with a counter-weight 46, tending to urge the ring in a clockwise direction, as seen in the drawings, with a force sufficient to balance the spring of bellows 11 and the dead weight of other parts carried by, or bearing on, the ring, which may have a tendency to turn the ring counterclockwise.

The automatic re-set 85 comprises a housing 92, having therein a flexible member, such as a bellows 93, which is closed at its upper end and sealed at its lower end to the diaphragm housing, thereby providing a pressure chamber 94. The bellows 93 acts through a push rod 95 on ring 1, on the side opposite bearing 4, with respect to which the balancer 10R acts on the ring. A needle valve 96 is provided in the connecting pipe 91, and may be adjusted in accordance with the rate at which it is desired that pressure shall build up or change in housing 92, with respect to the pressure developed in the balancer 10R. A volume chamber or tank 97 may be connected to pipe 91 at a point between needle valve 96 and housing 92, to give stability and certain desirable operating characteristics to the regulating device.

As is evident by inspection of Fig. 1, the force exerted by the balancer 10R on the ring 1 opposes the turning force of the pressure differential ($P_1-P_2$) acting on the pressure chambers within the ring, and that the force exerted by the push rod 95 of the re-set 85 acts in the same direction as the turning force developed by the pressure differential ($P_1-P_2$).

By adjusting the distances X' and Y', at which the respective balancer 10R and automatic re-set 85 act on ring 1 with respect to the center of bearing 4, it will be apparent that the regulator can be pre-set or pre-adjusted to maintain a given differential ($P_1-P_2$) across an orifice 87 in a pipe line 86, such as indicated in Fig. 4. If the differential increases above this pre-set value, the ring will turn clockwise as seen in Fig. 1, whereby the pressure developed in balancer 10R is increased, tending to restrain turning rotation of the ring; however, this pressure gradually is transferred to, and builds up in, the automatic re-set 85 which, as stated above, acts on the ring in the same direction as the force of the pressure differential ($P_1-P_2$). Therefore, the inlet port of the valve balancer 10R will remain open and cause the pressure to build up even to a maximum value until the regulator, such as regulator 89, has adjusted the position of damper 88 sufficiently to bring the differential ($P_1-P_2$) back to the pre-set value. As the differential ($P_1-P_2$) approaches the pre-set value, the pressures in the automatic re-set 85 and in the balancer 10R will approach equality and balance. When the pressure ($P_1-P_2$) has been restored to the pre-set value, the ring will be in equilibrium with that pressure differential, and the opposing forces exerted by the automatic re-set and the balancer will be equalized. The volume chamber 97 acts to give stability to the automatic re-set feature and, with the needle valve, depending upon its adjustment, controls the rate of response of the automatic re-set to a departure of the pressure differential ($P_1-P_2$) from the pre-set value.

As indicated in Fig. 1, the balancer unit 10R and automatic re-set 85 may be adjusted towards or away from the bearing 4, to adjust the device to the particular operating conditions encountered in any particular installation.

In Fig. 4 there is illustrated a pressure regulator having an automatic re-set, such as shown in Fig. 1, but which is modified in these particulars: Ring 1 is mounted at its center on a ball bearing 47, or other anti-friction bearing other than a knife edge; the balancer 48" comprises a chamber 50" provided with a flexible diaphragm 51"; and the pressure-transmitting valve is an escapement valve 49" actuated by ring 1. Valve 49" transmits its output pressure to the balancer 48" and to the automatic re-set 85", and a volume chamber 97. As shown, ring 1 is connected across the orifice 87 by pipe connections 99 and 100, so that the pressures $P_1$ and $P_2$ act in chambers 6 and 7, respectively, of the ring. The valve 49" is actuated by ring 1 in the manner described in connection with Figs. 1 and 2, and the balancer 48" and automatic re-set 85" operate in the same manner as the balancer and automatic re-set of Fig. 1 operate.

In Fig. 4 the ring 1, with its balancer 48" and automatic re-set 85", are arranged to control regulator 89 so that the pressure difference ($P_1-P_2$) across orifice 87, is maintained at a particular value or set point. As shown, the up-stream side of orifice 87 is connected by a pipe 100 to the pressure ($P_1$) side of partition 2, and the down-stream side of the orifice is connected by pipe 99 to the pressure ($P_2$) side of the partition. If the pressure differential ($P_1-P_2$) increases above the control or set point value, ring 1 will turn slightly clockwise, thereby adjusting the escapement valve 49" so that an increased pressure is delivered to regulator 89. That increased pressure shifts damper 88 towards a more closed position, thereby decreasing the flow through the orifice 87 and the resulting pressure difference ($P_1-P_2$). The increased pressure transmitted by valve 49" is delivered to the balancer 48", which acts to restrain the increased pressure difference ($P_1-P_2$) acting on the ring. The transmitted pressure also flows through the needle valve 96 to the automatic re-set 85". As the pressure in the automatic re-set 85" increases, the force exerted by it on the ring gradually cancels out the force exerted by balancer 40" on the ring. These forces are ultimately equalized when the pressure difference ($P_1-P_2$) has been brought back to the pre-set value.

The device shown in Fig. 1 may be utilized in the arrangement shown in Fig. 4, by merely connecting the fittings 8 and 9 to pipes 100 and 99, respectively, so that pressure ($P_1$) acts on the left-hand side of diaphragm or partition 2, and the pressure ($P_2$) acts on the opposite side thereof.

Having thus described the invention, what is claimed as new and desired to be secured by Letters Patent is:

1. A regulator responsive to deviations in a pressure differential from a pre-selected control point and provided with means for transmitting a control pressure and an automatic re-set disposed to so modify the response of the regulator that the regulator is out of balance until the differential has been restored to said predetermined control point, said regulator comprising a hollow ring mounted at its center on a substantially frictionless bearing, said ring having therein a partition located at a point above said bearing, and a quantity of heavy liquid which, with said partition, divides said ring into two pressure-tight chambers, means for applying unequal pressures to said chambers whereby the force of the difference between said pressures acting on said liquid and partition effects relative movement between the liquid and ring, a pair of housings stationarily mounted with respect to said ring, each housing having a flexible wall responsive to pressures in said housing, said flexible walls being connected to said ring to exert forces thereon at points removed from said bearing and in directions opposing each other, the interiors of said housings being connected by a passageway having an orifice therein, and a valve actuated in response to angular movement of said ring for transmitting a control pressure to the interior of one of said housings, said control pressure being also transmittable to a regulator controlling the pressures in said chambers, the pressures in said housings being unequal while the difference between said chamber pressures remains in departure from the pre-selected control point.

2. A regulator according to claim 1, characterized by the fact that a volume chamber is connected to said passageway at a point between the orifice and one of said housings, and that the control pressure from said valve is delivered to the other housing.

3. A regulator according to claim 1, characterized by the fact that the housing to which the control pressure is delivered by said valve and said valve comprise a unitary assembly, the housing having an inlet port provided with a valve seat, a pressure sending port, and an exhaust port in said flexible wall provided with a valve seat, and that the valve comprises a stem having at one end an element disposed to seat on said inlet port seat and its opposite end disposed to seat on the exhaust port seat, the valve ports being closed when said ring is in neutral position and the differential acting on said ring is at the control point value, the inlet port being open and the exhaust port closed when the differential exceeds said preset control point value, the exhaust port being open and the inlet port closed when said differential is less than said control point value, the automatic re-set exerting a force on said ring tending to shift the valve out of neutral position until the control point differential is re-established.

References Cited in the file of this patent

UNITED STATES PATENTS

| | | |
|---|---|---|
| 2,331,153 | Ackley | Oct. 5, 1943 |
| 2,451,425 | Allwein | Oct. 12, 1948 |
| 2,505,981 | McLeod | May 2, 1950 |
| 2,543,120 | McLeod et al. | Feb. 27, 1951 |

FOREIGN PATENTS

| | | |
|---|---|---|
| 536,537 | Great Britain | May 19, 1941 |